May 22, 1923.

L. C. VANDERLIP

VEHICLE STEERING MECHANISM

Filed Aug. 30, 1920

1,455,941

INVENTOR
Louis C. Vanderlip.

Patented May 22, 1923.

1,455,941

UNITED STATES PATENT OFFICE.

LOUIS C. VANDERLIP, OF ELKHART, INDIANA.

VEHICLE STEERING MECHANISM.

Application filed August 30, 1920. Serial No. 406,931.

*To all whom it may concern:*

Be it known that I, LOUIS C. VANDERLIP, a citizen of the United States, residing in Elkhart, county of Elkhart, Indiana, have invented certain new and useful Improvements in Vehicle Steering Mechanism, of which the following is a specification.

This invention relates to vehicle steering mechanism and especially to steering wheel locking devices for motor vehicles.

An object of my invention is to provide a steering wheel lock in which the key to the bolt actuating lock may be withdrawn after the locking bolt has been moved thereby to either of its normal limits. Another object of my invention is to provide a simple, cheap and effective locking device whereby the steering gear of a motor vehicle may be rendered inoperative to unauthorized persons. A third object of my invention is to provide improved anti-friction bearing means between the steering wheel and steering post. Other objects of my invention are mentioned and described herein.

Figure 1:
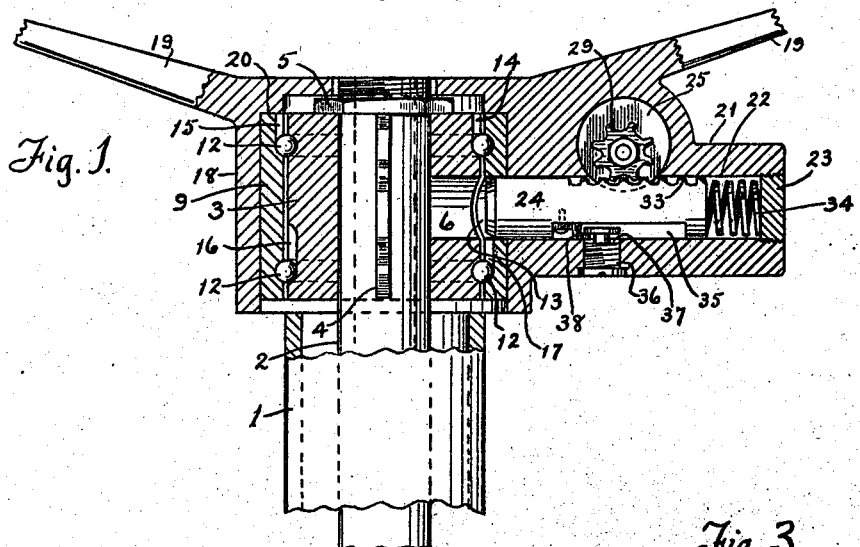
Figure 2:
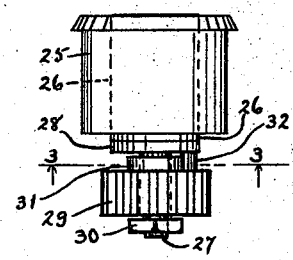
Figure 3:
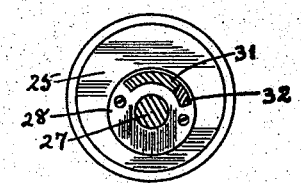
Figure 4:
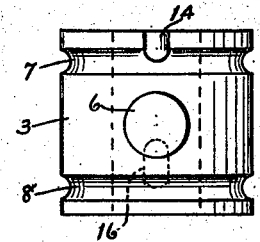
Figure 5:
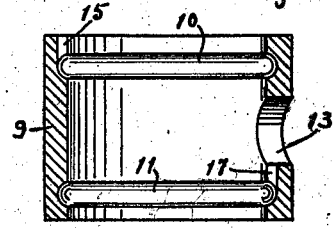
Figure 6:
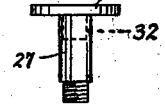
Figure 7:
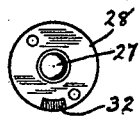

The preferred embodiment of my invention is illustrated in the accompanying drawing in which Figure 1 is a sectional side elevation of a steering wheel in fragment, steering post, and other members, to which my invention is applied, in which figure the locking bolt is retracted and the steering wheel is independently rotatable on the steering post; Fig. 2 is a view showing the tumbler lock, pinion and other members for actuating the locking bolt; Fig. 3 is a section taken on the line 3—3 of Fig. 2; Fig. 4 is a side elevation view of the driver hub or collar; Fig. 5 is a view showing the ball bearing sleeve in side elevation and in section; Fig. 6 is a plan view of the shaft for carrying the bolt actuation pinion; and Fig. 7 is a front elevation of the same member.

Similar numerals of reference indicate like members throughout the several views on the drawing.

Referring to the details of the drawing, the numeral 1 indicates the usual hollow cylindrical steering column within which the usual cylindrical, or any type of, steering post 2 is arranged, the latter being adapted for connection with the steering gear—not shown—of the vehicle, as is well known in the particular art. Numeral 3 indicates a hollow cylindrical driver hub rigidly mounted upon the top end of the post 2 to which it may be keyed by a key 4 to prevent rotative movement thereof on said post. A nut 5 may be screw threaded upon the post 2 above the driver hub 3 to confine the latter against longitudinal movement on or displacement from the post. The hub member 3 may have the radially formed bolt socket 6 intermediate the two circumferential grooves 7 and 8, said grooves being adapted to serve as ball races or containers, as hereinafter described.

The numeral 9 indicates a hollow cylindrical ball bearing sleeve member encompassing the hub 3, the bore of said sleeve being slightly larger than the exterior diameter of said hub, said sleeve bore having the two annular endless grooves 10 and 11 formed therein which are adapted to cooperate with the hub grooves 7 and 8, respectively, to carry the anti-friction balls 12, a plurality of which are mounted in each of said groove units. The sleeve 9 is provided also with the bolt aperture 13 which is adapted to be placed in registration with the bolt socket 6 formed in the hub 3. Numerals 14 and 15 indicate upright slots formed, respectively, in the hub 3 and sleeve 9 and communicating respectively, with the grooves 7 and 10 to enable the introduction of a suitable number of the balls 12 into said cooperating grooves. The numerals 16 and 17 indicate upright slots formed respectively, in the exterior of the hub 3 and the bore of the sleeve 9 and communicating respectively, with the grooves 8 and 11 to enable the introduction of a suitable number of the balls 12 into said grooves, the slot 17 having its upper end in communication with the orifice 13 through which said balls may be passed when said slots are brought into registration.

The numeral 18 indicates a steering wheel hub which may be provided with the usual spider arms 19, 19, said wheel hub being bored to detachably encompass the sleeve member 9, the upper end of said hub bore being provided with the annular shoulder portion 20 which engages the upper end of said sleeve and by which said wheel may be wholly carried. The numeral 21 indicates a casing projecting laterally from the wheel hub 18 and provided with a radially arranged bolt chamber 22 which is disposed axially of the sleeve orifice 13, the inner end of said bolt chamber being in communication with said sleeve orifice and the outer end thereof being closed by a plug 23. A locking bolt 24 is slidably arranged within the chamber 22 and adapted to be alternately moved into and out of engagement with the hub socket 6 through the sleeve orifice 13 to effect a locked or unlocked relation between the wheel hub 18 and the driver hub 3. Normally, when the bolt 24 is retracted from the hub socket 6, its inner end is disposed within the sleeve orifice 13, as indicated in Fig. 1, whereby the wheel and sleeve 9 are free to rotate together on the balls 12 around the collar 3, and whereby displacement of the wheel hub 18 from the sleeve 9 is prevented. Obviously, the sleeve 9 is held against axial movement relative to the post 2 by the balls 12 operating in their respective races, as described.

Disposed in the casing 21 and transversely of the bolt chamber 22 is a tumbler lock 25 of any suitable type, said lock having a revoluble key barrel 26, as is well known, which barrel is held against rotation by certain tumblers—not shown—when the lock key—not shown—is withdrawn therefrom, as is well known in the art. A pinion shaft 27 may be rigidly mounted upon the inner end and axially of the key barrel 26, being suitably flanged at 28 for that purpose. A tooth pinion or gear 29 is revolubly mounted upon the shaft 27 and confined thereon by a nut 30. A lost motion device between the shaft 27 and the pinion 29 is effected by a lug 31, carried on the end of the pinion 29, and a lug 32 projecting from the shaft flange 28, the pinion lug 31 being arranged in the path of movement of the lug 32 when the key barrel 26 is rotated by the key controlled and actuated by the operator.

A tooth rack 33 may be formed on the bolt 24 with which rack the pinion 29 is in constant mesh. A spring 34 may be provided within the chamber 22 to bear against the bolt 24 to aid in the forward movement thereof. The bolt 24 may be cut away at 35 for a portion of its length and a hook member 36 may be rigidly secured to the bolt within such cut away portion. A stop member 36 may be screw threaded into the casing 21 transversely of the bolt chamber, the inner end of said stop member projecting into the bolt cut away portion 35. An annular circumferential groove 37 may be formed in the stop member 36, said groove being adapted to be engaged by the point of the hook 38, which is rigidly secured to the bolt 24, such engagement being effected when the bolt is retracted from the socket 6, whereby removal of said stop member is prevented.

In the practical application of my invention the hub 3, the sleeve 9 and the bearing balls 12 are assembled, as described, as a unit, the hub 3 of said unit being thereafter keyed to the steering post. Thereafter, the wheel hub 18 may readily be mounted in encompassment of the sleeve 9 by removing the stop member and retracting the bolt 24 wholly within the bolt chamber 22, and thereafter projecting the bolt 24 into the hub socket 6 and replacing the stop member 36. When a removal of the steering wheel is desired, the bolt 24 is first projected into the socket 6 of the hub 3, thereafter, the stop screw 36 is removed which enables the ready retraction of the bolt 24 out of both socket 6 and sleeve orifice 13. In Fig. 3 of the drawing the relation of the lost motion lugs 31 and 32 is illustrated when the bolt 24 is retracted with its point arranged within the sleeve orifice 13, in which position the tumblers of the lock 25 act to restrain the bolt against the action of the spring 34.

Also, the position of the members as shown in Fig. 3 of the drawing enables the removal of the key from the barrel 26 of the lock 25. When the key is again inserted in the lock 25 and the tumblers thereof actuated, or lifted, thereby, the spring 34 acts and projects the bolt 24 into the socket 6 of the hub 3, lugs 31 and 32 being actuated thereby. Thereafter, the lug 32 is further actuated by the key of the lock 25 and a complete revolution of the key barrel 26 effected which enables the operator to remove the key from the lock, which is very desirable in devices of this character.

It will be apparent that various changes may be made in the form, construction and arrangement of the parts without departing from the spirit and scope of the invention or sacrificing any of its material advantages.

I claim:

1. In a mechanism of the class described, a shaft; an encompassing member rotatable thereon; means for preventing relative axial movement of said encompassing member and shaft; a member encompassing said first mentioned encompassing member; and means whereby the said second mentioned encompassing member may be releasably locked to said shaft, said locking means being adapted to engage said first mentioned encompassing member, when released from the shaft, for retaining the second mentioned encompassing member on the first.

2. In a mechanism of the class described, a post; a driver hub rigidly secured to the post; an encompassing member rotatable on said hub; means for preventing relative axial movement of said encompassing member and hub; a member removably encompassing said first mentioned encompassing member; and means whereby the second mentioned encompassing member may be releasably locked to said driver hub, said locking means being adapted to engage said first mentioned encompassing member, when released from the driver hub, for retaining the second mentioned encompassing member on the first.

3. In a mechanism of the class described, a post; a driver hub rigidly secured to the post; an encompassing member arranged around said hub member; anti-friction bearings supporting said encompassing member on said hub to enable the former to rotate freely on the latter, said bearings preventing relative axial movement of said hub and encompassing member; a member removably encompassing said first mentioned encompassing member; and means whereby said second mentioned member may be releasably locked to said driver hub, said locking means being adapted to engage the first mentioned encompassing member, when released from the driver hub, for retaining the second mentioned encompassing member on the first.

4. In steering wheel locking mechanism, a steeing post; a driver hub rigid therewith, said driver member having a bolt-engaging orifice on its perimeter; a sleeve encircling the driver hub, said sleeve having an opening adapted to register with said bolt-engaging orifice in the driver hub; means for preventing relative axial movement of the sleeve with respect to the driver member while permitting said sleeve to rotate freely with respect thereto; a removable steering member having a hub adapted to fit over said sleeve; a movable locking device carried by said steering member hub and adapted to be engaged in the opening in said sleeve and the orifice in said driver hub, or in the opening in the sleeve alone, to retain the steering member on the sleeve.

5. In a device of the class described, a steering post; a driver hub on said post, said driver hub having an orifice in its perimeter; a sleeve member encompassing said driver hub, said sleeve having an aperture adapted to register with said driver hub orifice; anti-friction bearing means between said sleeve and driver hub, whereby said sleeve member is freely revoluble upon said driver hub, and whereby axial movement of said sleeve member relative to said driver hub is prevented; a steering member removably encompassing said sleeve member; and means carried by the steering member and engaging said driver hub orifice through said sleeve member aperture for releasably locking said steering member to said driver hub, said locking means being adapted to engage the sleeve member aperture, when released from the driver hub orifice, for retaining said steering member on said sleeve member.

6. In a steering wheel locking mechanism, a steering post; a driver hub rigid therewith, said hub member having a bolt-engaging orifice in its perimeter; a sleeve encircling said driver hub, said sleeve having a hole adapted to register with said bolt-engaging orifice in the driver hub; means for preventing relative axial movement of the sleeve with respect to the driver hub while permitting said sleeve to rotate freely with respect thereto, said means comprising registering grooves in the outer and inner circumference of the driver hub and sleeve, respectively, and ball bearing elements engaging said grooves; a steering member having a hub adapted to removably fit over said sleeve; a movable locking device carried by said steering member hub and adapted to be engaged with the opening in the sleeve and orifice in the driver hub, or with the opening in the sleeve alone, to retain the steering member on the sleeve.

7. In steering wheel locking mechanism, a steering post; a driver hub rigid therewith, said driver hub having a bolt-engaging orifice in its perimeter; a sleeve encircling the driver hub, said sleeve having an opening adapted to register with said bolt-engaging orifice in the driver hub; means for preventing relative axial movement of the sleeve with respect to the driver member while permitting said sleeve to rotate freely with respect thereto; a steering member having a hub adapted to removably fit over said sleeve; a movable locking device carried by said steering member hub and adapted to be moved into engagement with the opening in said sleeve and the orifice in said driver hub, or with the opening in the sleeve alone for retaining the steering member on the sleeve; and means to prevent unauthorized shifting of the locking device from either of its positions of engagement.

8. In a steering wheel locking mechanism, a steering post; a driver member rigid therewith, said driver member having a radial bolt-engaging orifice; a steering member having a hub adapted to encircle said driver member, there being a bolt guideway in said hub adapted to register with the bolt-engaging orifice in the driver member; a bolt movable in said guideway, means connected with the driver member adapted to engage the end of the bolt to prevent axial movement of the steering member relative to the driver member while permitting said steering member to revolve freely on said driver member; a movable abutment mounted on the steering member and arranged to prevent the retraction of the bolt beyond the position where it is adapted to engage said member connected to the driver member, said abutment comprising an overlying ledge; and means on the bolt adapted to engage under said ledge when the bolt is retracted from said bolt-engaging orifice, and stop it in position to prevent removal of the steering member, whereby, at that time, removal of the abutment is impossible.

9. In a steering wheel lock, the combination of a steering post having a driver member provided with a radial bolt-engaging orifice; a steering member having a hub encircling said driver member, there being a bolt guideway in said hub adapted to register with the bolt engaging orifice in said driver member; a bolt in said guideway adapted to engage said orifice; means adapted to rotate on said driver member and to be engaged by the end of the bolt after its retraction from said orifice in the driver member, whereby to prevent axial removal of said steering member; an abutment adapted to limit the retractive movement of the bolt, said abutment comprising a removable pin having an overhanging ledge; and a member carried on the bolt adapted to engage under said ledge.

10. In a steering wheel lock, a steering post carrying a driver member having a radial orifice; a steering member provided with a hub adapted to be sleeved over said driver member, said hub having a bolt guideway; a bolt movable in said guideway; means adapted to rotate on the driver member and to be engaged by the end of the bolt for preventing axial removal of the steering member while permitting free rotation thereof on said driver member when said bolt is withdrawn from said orifice; a movable abutment on said steering member adapted to stop the bolt in its retracting movement in position to engage said means to prevent removal of the steering member, said bolt having a lateral groove adapted to receive the end of the movable abutment; a lip on said bolt, said movable abutment being provided with a ledge adapted to engage over said lip on the bolt whereby the steering member cannot be removed while the bolt is locked to hold the steering member in inoperative position.

11. In mechanism of the class described, a steering post; a driver hub mounted on said post; a sleeve member encompassing said hub and rotatable thereon; means for preventing relative axial movement of said sleeve member and hub; a steering member fitted over said sleeve and wholly carried thereby; and means whereby said steering member may be releasably locked to said driver hub, said locking means being adapted to engage the sleeve member, when released from the driver hub, for retaining the steering member on the sleeve member.

12. In mechanism of the class described, a steering post, a driver hub mounted on said post; a sleeve member arranged around said hub member; anti-friction bearings supporting said sleeve member on said hub to enable the former to rotate freely thereon, said bearings preventing relative axial movement of said hub and sleeve member; a steering member fitted over said sleeve and carried thereby; and means whereby said steering member may be releasably locked to said driver hub, said locking means being adapted to engage the sleeve member, when released from the driver hub, for retaining the steering member on said sleeve member.

13. In mechanism of the character described, a steering post; a driver hub mounted upon said post; a sleeve member arranged around said hub member; a plurality of sets of anti-friction bearings supporting said sleeve member on said hub to enable the former to rotate freely thereon, said bearings preventing relative axial movement of said hub and sleeve member, said anti-friction bearing sets being arranged in different planes; a steering member fitted over said sleeve; and means whereby said steering member may be releasably locked to said driver hub, said locking means being adapted to engage the sleeve member, when released from the driver hub, for retaining the steering member on said sleeve member.

14. In mechanism of the character described, a steering post; a driver hub mounted upon said post; a sleeve member arranged around said hub member; a plurality of sets of anti-friction bearings supporting said sleeve member on said hub to enable the former to rotate freely thereon, said bearings preventing relative axial movement of said hub and sleeve member, said anti-friction bearing sets being arranged in different planes; a steering member fitted over said sleeve; and means whereby the steering member may be releasably locked to said hub, said locking means being adapted to engage the sleeve member, when released from said hub, for retaining the steering member on said sleeve member.

15. In a device of the class described, a steering post; a driver hub on said post, said driver hub having an orifice in its perimeter; a sleeve member encompassing said driver hub, said sleeve having an aperture adapted to register with said driver hub orifice; anti-friction bearing means between said sleeve and driver hub, whereby said sleeve member is freely revoluble upon said driver hub, and whereby axial movement of said sleeve member relative to said driver hub is prevented; a steering member removably encompassing said sleeve member; and means carried by the steering member and engaging said driver hub orifice through said sleeve member aperture for releasably locking said steering member to said driver hub.

In testimony whereof I have hereunto affixed my signature this 28th day of August, 1920.

LOUIS C. VANDERLIP.